United States Patent
Murai

(10) Patent No.: US 8,914,461 B2
(45) Date of Patent: Dec. 16, 2014

(54) METHOD AND DEVICE FOR EDITING WEB CONTENTS BY URL CONVERSION

(75) Inventor: Masanori Murai, Kanazawa (JP)

(73) Assignee: Cyberstation, Inc., Kanazawa-Shi, Ishikawa (JP)

( * ) Notice: Subject to any disclaimer, the term of this patent is extended or adjusted under 35 U.S.C. 154(b) by 840 days.

(21) Appl. No.: 12/310,325

(22) PCT Filed: Jul. 27, 2007

(86) PCT No.: PCT/JP2007/064772
§ 371 (c)(1),
(2), (4) Date: Mar. 13, 2009

(87) PCT Pub. No.: WO2008/023533
PCT Pub. Date: Feb. 28, 2008

(65) Prior Publication Data
US 2009/0319669 A1    Dec. 24, 2009

(30) Foreign Application Priority Data
Aug. 23, 2006 (JP) ................................. 2006-226046

(51) Int. Cl.
*G06F 15/16* (2006.01)
*H04L 29/08* (2006.01)
*G06F 17/24* (2006.01)
*H04L 29/12* (2006.01)

(52) U.S. Cl.
CPC ............... *H04L 67/06* (2013.01); *G06F 17/24* (2013.01); *H04L 29/12594* (2013.01); *H04L 61/301* (2013.01); *H04L 67/2823* (2013.01); *H04L 67/2814* (2013.01); *H04L 67/02* (2013.01)

USPC .......................... 709/217; 709/219; 709/201

(58) Field of Classification Search
None
See application file for complete search history.

(56) References Cited

U.S. PATENT DOCUMENTS 6,990,629 B1 * 1/2006 Heaney et al. ................ 715/200
7,533,144 B2 * 5/2009 Kassab ......................... 709/203
(Continued)

FOREIGN PATENT DOCUMENTS

JP    2001-266003    9/2001
JP    2001-331410    11/2001
(Continued)

*Primary Examiner* — Azizul Choudhury
(74) *Attorney, Agent, or Firm* — Manabu Kanesaka

(57) ABSTRACT

It is possible to provide a method and device for enabling a WEB server having no WEB edition system inside to edit and update WEB contents directly from a WEB browser by converting and accessing a disclosed WEB contents public URL. For this, a relay server is installed for mediating between a WEB server having file transfer means, such as FTP, and a WEB browser for browsing the WEB contents. By converting the disclosed URL of the contents from the WEB browser based on a predetermined procedure, the connection destination is switched from the WEB server to the relay server. The relay server specifies the WEB server and the positions of the contents data according to the URL accessed by the WEB browser and relays the contents date acquisition and storage for the WEB server in accordance with a request from the WEB browser. Moreover, the relay server provides the WEB browser with an application for editing the contents. Thus, it is possible to acquire, edit and update the contents.

12 Claims, 6 Drawing Sheets

(56) References Cited

U.S. PATENT DOCUMENTS

| | | | |
|---|---|---|---|
| 7,587,251 B2 * | 9/2009 | Hopsecger | 700/17 |
| 7,716,352 B2 * | 5/2010 | Leetaru et al. | 709/229 |
| 2003/0023754 A1 * | 1/2003 | Eichstadt et al. | 709/246 |
| 2004/0117732 A1 * | 6/2004 | McNeill et al. | 715/513 |
| 2004/0254832 A1 * | 12/2004 | Harkin | 705/14 |
| 2006/0031404 A1 * | 2/2006 | Kassab | 709/218 |
| 2006/0155780 A1 * | 7/2006 | Sakairi et al. | 707/201 |
| 2006/0218304 A1 * | 9/2006 | Mukherjee et al. | 709/246 |

FOREIGN PATENT DOCUMENTS

| | | |
|---|---|---|
| JP | 2002-140259 | 5/2002 |
| JP | 2003-131921 | 5/2003 |
| JP | 2005-157822 | 6/2005 |

* cited by examiner

METHOD AND DEVICE FOR EDITING WEB CONTENTS BY URL CONVERSION

TECHNICAL FIELD

The present invention relates to a method and device for readily editing and updating WEB contents data disclosed on the Internet from a WEB browser.

BACKGROUND ART

An embodiment for managing WEB contents disclosed on the Internet is mainly divided into two, one being a managing method made on a terminal side for installing a WEB contents-managing application within an Internet terminal and the other being a managing method made on a server side for installing a contents-managing system, such as a contents management system (hereinafter referred to as the CMS), within a WEB server.

In the case of the managing method made on the terminal side, a terminal retains therein a set of contents files the same as that retained in the WEB server to edit the contents files with a contents-managing application (such as a WEB editor tool) and update the edited files through uploading the edited files as needed to the WEB server with file transfer software (such as an FTP tool).

In the case of the managing method made on the server side, a CMS having a database function to mainly manage contents data one-dimensionally, a managing function to edit and update contents data within a database and a disclosing function to obtain contents data from the contents data within the database and dynamically or statically produce pages is installed in a server to access the CMS within the server from a terminal with a WEB browser or dedicated application, thereby managing, editing and updating the contents data.

DISCLOSURE OF THE INVENTION

Problems the Invention Intends to Solve

According to the conventional method of managing WEB contents, it is necessary to introduce a dedicated application or system into a terminal or server and, therefore, terminal users are required to have a certain level of skill in installing the application in the terminal and, furthermore, it is necessary to install the application relative to all terminals utilized for the management. In addition, expertise is required for installing a system in a server and, moreover, an introduction work is required relative to all servers that manage contents, resulting in a large cost burden for the introduction, maintenance and management.

In the case of making the management using the application on the terminal side, an administrator is required to have skills in the installation of applications, initialization work for FTP information etc. and synchronization management of files within the terminals and on the sites.

Furthermore, when plural persons in charge make the management jointly, there are cases where data are returned and where contents data are scattered on the servers or within the terminals of the respective persons in charge.

In the case of making the management with a CMS on the server side, it is necessary to build dedicated environments for operating the CMS including "construction of a CMS-compliant server", "CMS installation work", "preparation of a CMS-compliant template design" at the time of the introduction of the CMS, resulting in a large cost burden for the initial introduction.

In the case of having already possessed existing WEB contents, since it is necessary to prepare a design as a dedicated template and repopulate data in order to make the management with the CMS, the cost is incurred in terms of the time and labor of data porting.

An object of the present invention is to realize the management of WEB contents from plural clients by providing all functions on the management of the WEB contents through a relay center without performing any new installation or other work relative to client and server sides. Another object is to enable rapid introduction of a WEB contents management system by making it possible to edit the WEB contents within the existing server without incurring any cost of the preparation of a design template or site porting.

Means for Solving the Problems

A relay server is provided in order to mediate between a WEB server having file transfer means, such as FTP, and a WEB browser for browsing WEB contents. An edit URL having a connection destination switched from the WEB server to the relay server through reversible conversion of a public URL of the contents from the WEB browser is accessed. In the relay server, the WEB server and contents data positions are specified based on the edit URL accessed from the WEB browser, and the acquisition and storage of the contents data from the WEB server are mediated in accordance with a request from the WEB browser. In addition, an application for editing the contents is given to the WEB browser from the relay server to enable acquisition, edit and storage of the contents.

In the concrete embodiment of the present invention, the relay server accepts an access to the edit URL and specifies the public URL before being converted on the basis of the edit URL. For this reason, the conversion procedure of the URL adopts a reversible conversion enabling restoration to the original URL. However, since it is not always true that the reversibility of the URL can completely be secured using only the character string within the edit URL, there is a case where the reversibility is secured through the retrieval of a library, a dictionary, a database, a session, etc.

Effects of the Invention

According to the present invention, by accessing the edit URL having the public contents URL reversibly converted from the WEB browser, as described above, an access destination is switched to the relay server to transmit data for specifying the public contents URL to the relay server.

The relay server acquires target contents data from the public WEB server, when necessary, in reply to a request from the WEB browser and thereafter responds to an edit application necessary for editing the public contents or contents data acquired through mediation.

The WEB browser develops the application for editing the contents or contents data acquired from the relay server and brings the contents to an editable state.

The relay server transfers the contents data to the public WEB server through mediation when it has received a request for saving the contents data edited on the WEB browser.

EXPLANATION OF REFERENCE NUMERALS

S1 Internet terminal
S2 WEB browser
S3 Relay server
S4 WEB server
S5 URL conversion processing
S6 Inner system
S7 Session function
S8 HTTP Proxy function
S9 Function added to editor (protocol conversion function)
S10 License checking function
S11 Inner file area
S12 Database
S13 License information
S14 Public server
S15 FTP server
S16 Contents file area
S17 Conversion of public URL
S18 Access to edited URL
S19 Access acceptance
S20 Specification of "WEB server" and "contents save position" by restoration-conversion from accessed URL and production of "public URL"
S21 Response of editing application
S22 Display of edit screen on WEB browser
S23 Contents editing operation
S24 Contents save request
S25 Acceptance of content save request
S26 Designation of public URL to request saving contents data
S27 Acceptance of HTTP/PUT request
S28 Save of contents data requested
S29 Response of contents-save successful
S30 Screen display of save successful
S31 Access to public URL
S32 Acceptance of HTTP/GET request
S33 Response of saved contents data
S34 Response of requested contents data
S35 Designation of public URL to request acquisition of contents data
S36 Response of edition application and public contents
S37 Specification of "WEB server" and "contents save position" by restoration-conversion from accessed URL
S38 Acquisition of public contents by FTP
S39 Acceptance of FTP/GET request
S40 Designation of specified "WEB server" and "contents save position" to send contents data by FTP
S41 Acceptance of FTP/PUT request
S42 Save of contents data
S43 Response of contents in requested site
S44 Session check
S45 Presence
S46 Absence
S47 Response of login screen
S48 Display of login screen
S49 Entry and send of login information
S50 Receipt of login information
S51 Login check
S52 Success
S53 Failure
S54 Session establishment processing
S55 Processing continuation
S56 Access to public URL (http://www.cyberone.jp/index.html)
S57 Conversion of public URL to edited URL (http://edit.to/editor.php?target=index.html)
S58 Access to edited URL in S57 to transfer file path only
S59 Login request
S60 Entry of ID/Password on login screen
S61 Acquisition of host name (www.cyberone.jp) from database through login processing
S62 Membership information of database server
S63 Save of host name and path in session
S64 Edit screen
S65 Save after edit
S66 Acquisition of host name and path from session
S67 Request for save in public URL area
S68 Save of edited contents

BEST MODE FOR CARRYING OUT THE INVENTION

Figure 1:
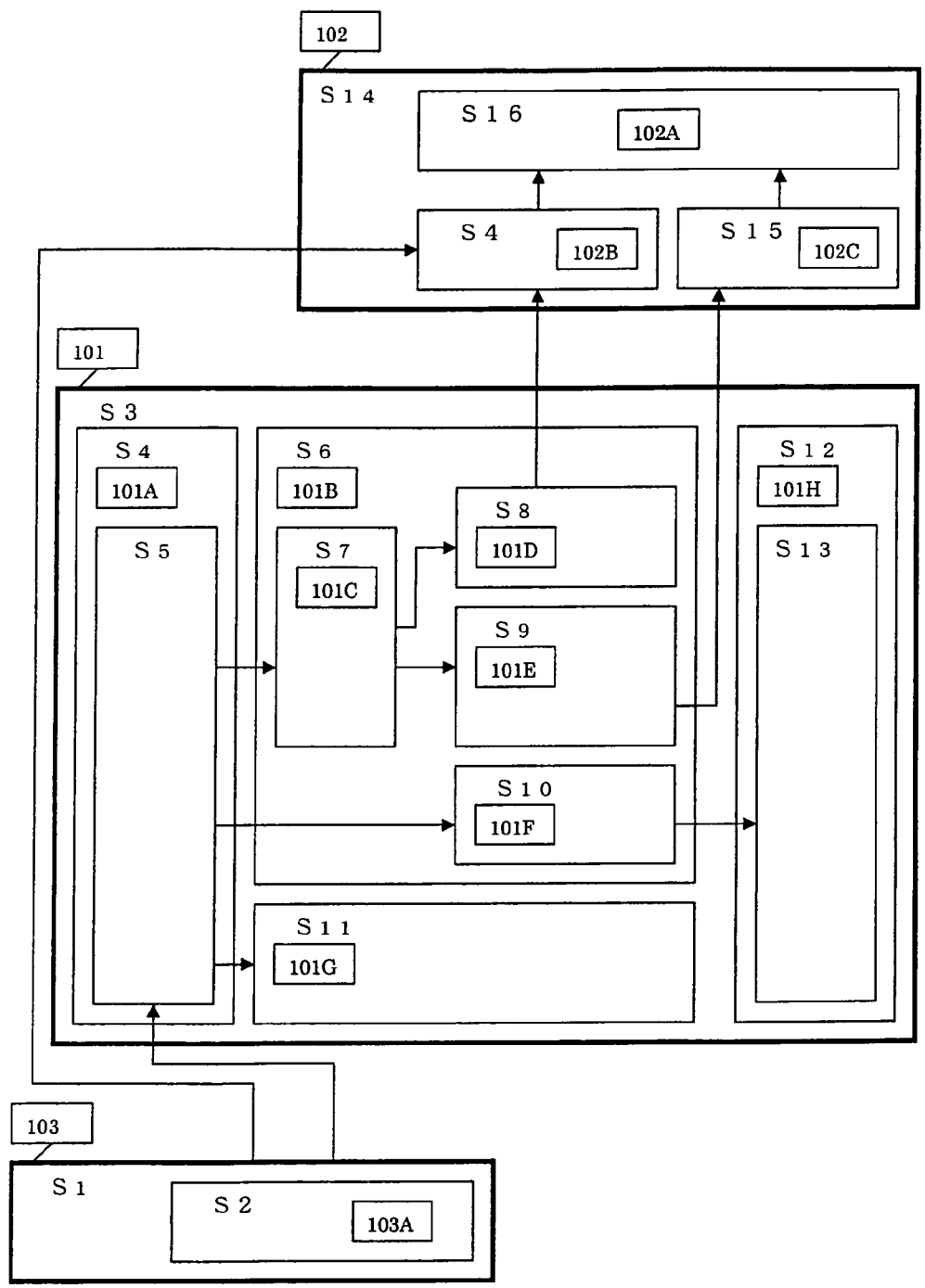
FIG. 1 is a function configuration diagram in an embodiment.

FIG. 1 shows an embodiment when having established a relay server system in accordance with the present invention. It is a function configuration diagram on a scheme for editing and updating contents file date within a contents file area 102A of a public server 102 from a WEB browser 103A within an Internet terminal 103 via a relay server 101.

The function configuration and operation procedure in the embodiment of the present invention are described as follows.

(1) A URL, which is accessible from the WEB browser 103A to a WEB server 102B within the public server 102 (http://www.cyberone.jp/index.html, for example), is used as a public URL.

(2) A URL having the public URL reversibly converted is used as an edit URL (the host name of http://www.cyberone.jp/index.html, for example, is added at the rear end thereof with a domain name ".edit.to" of the relay server into http://www.cyberone.jp.edit.to/index.html).

(3) The conversion switches a destination host from the public server 102 to the relay server 101 (In this case, it is necessary to set that the relay server 101 has www.cyberone-.jp.edit.to as its host name and accepts access from a client).

(4) The WEB server 101A within the relay server 101 accepts access from the WEB browser 103A to the edit URL and simultaneously acquires the edit URL requested to access.

(5) The WEB server 101A makes a conversion, based on the requested edit URL, into an inner URL for calling up a file within the inner system 101B or an inner file area 101G (using an Apache "mod_rewrite" function, for example).

(6) In the procedure of making a conversion to the inner URL, the conversion is made to an inner URL accessible to a contents file within the inner file area 101G ("http://www.cyberone.jp.edit.to/editor.php", for example) when an inner file key ("_innerfiles_", for example) is contained in the edit URL and to an inner URL accessible to the inner system 101B ("http:///www.cyberone.jp.edit.to/editor.php", for example) when the inner file key is not contained in the edit URL and, at the same time, the edit URL is transferred as an environment variable (as an example of setting mod_rewrite, "RewriteRule^.*/¥_interfiles¥_(.*)$/$1[L]" when setting URL conversion to the inner file area 101G or "RewriteRule^.*$/edotpr/@j@[L]" when setting URL conversion to the inner system 101B.

(7) The inner system 101B has the domain name of the relay server removed from the edit URL transferred as the environment variable to acquire the public URL.

(8) A license checking function 101F submits an inquiry about the public URL acquired to a database 101H to license-determine whether it is an editable URL.

(9) In the case where the license effectiveness has been validated, a session function 101C checks up on a state of establishment of a session. When it has been determined that the session is invalid, a login entry screen is replied to the WEB browser 103A to request entry of login information. Subsequently, the session function 101C receives the login information entered from the WEB browser 103A to make a login determination and, when the login information is normal, the session is established. A processing after the session establishment is returned to a continuation processing at the time the session has been determined as being invalid (the processing in the case where the session has been effective).

(10) When the session effectiveness has been confirmed, the processing is transferred from the session function 101C to a subsequent processing. The condition of sorting the subsequent processing is such that the processing continues in a function added to the editor 101E in the case where an extension in the public URL is ".html" ("http://www.cyberone.jp.edit.to/index.html", for example) or in an HTTP Proxy function 101D in the case where the extension is other than ".html" ("http://www.cyberone.jp.edit.to/image/title.gif", for example).

(11) The function added to the editor 101E allows, when necessary, an FTP server 102C within the public server 102 to acquire and store the public URL contents data (files within the contents file area 102A) through the FTP that is the file transfer protocol. The contents data after being acquired is replied to the WEB browser in a state thereof added with an editor application. The editor application at this time adopts a WYSIWYG editor operable on a browser, such as that of Ajax(JavaScript+XML) or Flash, JAVA applet or ActiveX. In addition, a function to make a conversion to a file transfer protocol, such as SFTP or SCP, besides the FTP, in the course of the file transfer is also retained.

(12) The HTTP Proxy function 101D serves as a Proxy that acquires by proxy from the WEB server 102B files of images, etc. necessary for displaying the preview of an editor application executed on the WEB browser.

A concrete process flow using an editor function is as follows.

(1) The WEB browser 103A is used to reversibly convert the public URL to access the edited URL.

(2) Since the edited URL has no inner file key, the WEB server 101A within the relay server 101 is used to make a conversion to an inner URL for accessing the inner system 101B.

(3) In the inner system 101B, the license checking function 101F submits to the database 101H an inquiry about whether the license of the public URL is effective.

(4) In the case of having confirmed the effectiveness of the license, a login request is replied to the WEB browser 103A.

(5) When entering and sending the login information (FTP account, password, etc.) from the WEB browser, the session function 101C checks up on the login information after passing steps (2) and (3) of the procedure again and, when the login information is normal, the session is established.

(6) After the session establishment, when the extension of the public URL in step (1) is ".html", the processing continues in the function added to the editor 101E and the public URL contents data are required relative to the FTP server 102C to acquire a target file within the contents file area 102A.

(7) An editor application is added to the acquired contents data (to be exact, a source having the acquired contents data inserted as an argument into an HTML source describing an editor application call tag is produced) and the resultant is replied to the WEB browser. On this occasion, inner file keys are included in all read URLs for the added editor application.

(8) The WEB browser 103A is used to develop the source replied in step (7) and read the added editor application.

(9) Since all the read URLs for the editor application requested relative to the WEB server 101A include the inner file keys, files of the editor applications (Ajax or Flash, JAVA applet, ActiveX, etc) stored in the inner file area 101G are replied.

(10) The editor application read in by the WEB browser 103A is executed to display a contents preview screen for editing the target contents. On this occasion, since image tags embedded in the contents are displayed, the relay server 101 is again accessed.

(11) Since an image URL requested relative to the WEB server 101A includes neither an inner file key nor an extension ".html", the processing continues the HTTP Proxy function 101D and is requested by proxy by the WEB browser 103A. Image data acquired by the request by proxy are replied to the WEB browser 103A and reflected as images within the contents preview.

(12) After the contents are edited in accordance with the editor application executed by the WEB browser 103B, the WEB server 101A is requested to save the contents.

(13) Since the contents save request URL becomes the edit URL in step (1), the processing continues in the function added to the editor 101E.

(14) The function added to the editor 101 requests the FTP server 102C to store the edited contents data sent from the WEB browser 103A in accordance with the save request.

(15) After the storage completion, a completion screen is replied relative to the WEB browser 103A.

Figure 2:
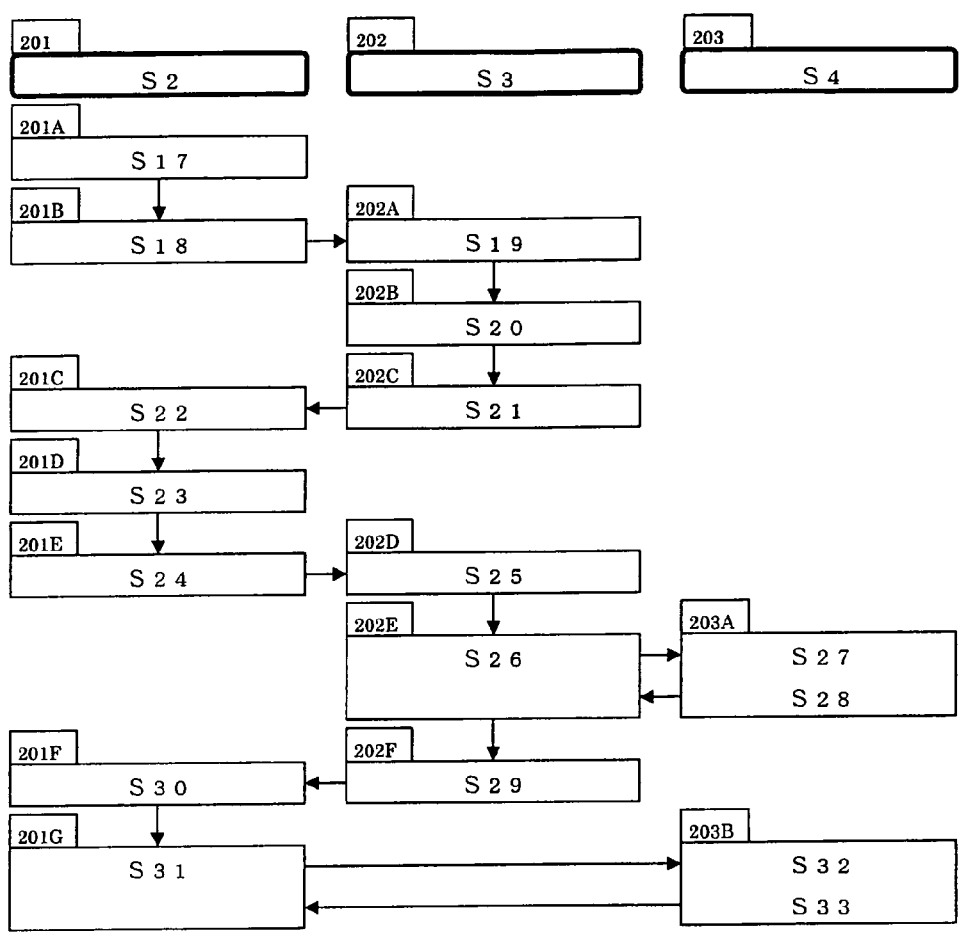
FIG. 2 shows a process flow on the edition and storage of contents data.

FIG. 2 shows a process flow on the edition and storage of contents data. This is a flow up to the storage of contents data prepared newly in a public server and constitutes the minimal configuration of the embodiment of the present invention.

(1) In the WEB browser, the edit URL having the public URL converted (201A) is accessed (201B). Means of access to the edit URL include, besides conversion by manual entry, automatic conversion by WEB browser plug-in, script conversion by JavaScript etc., access from a link to the edit URL embedded in a page, access from the edit URL bookmarked, and other access to the edit URL by a user of the WEB browser with no consciousness relative to the URL conversion.

(2) After acceptance (202A) of access in the relay server, the URL is restoration-converted (202B) to the public URL that is retained in the server.

(3) An editing application is responded (202C) from the relay server.

(4) The editing application responded and received is executed (201C) on the WEB browser to bring the contents data to an editable state.

(5) After edition (201D) of the contents, a contents save request (201E) is sent to the relay server.

(6) The relay server having accepted (202D) the save request designates the retained public URL and publishes (202E) the PUT method of the HTTP protocol to the WEB server.

(7) The WEB server having accepted (203A) the PUT method saves in the designated public URL area the contents data requested to save and replies the status thereof.

(8) After having confirmed the normal response by the relay server, the contents-save successful is responded (202F).

(9) Upon receiving the response of the save successful, the public URL before the URL conversion is directly accessed in the WEB browser to enable direct browse (203B) of the contents data requested to save from the WEB server.

Figure 3:
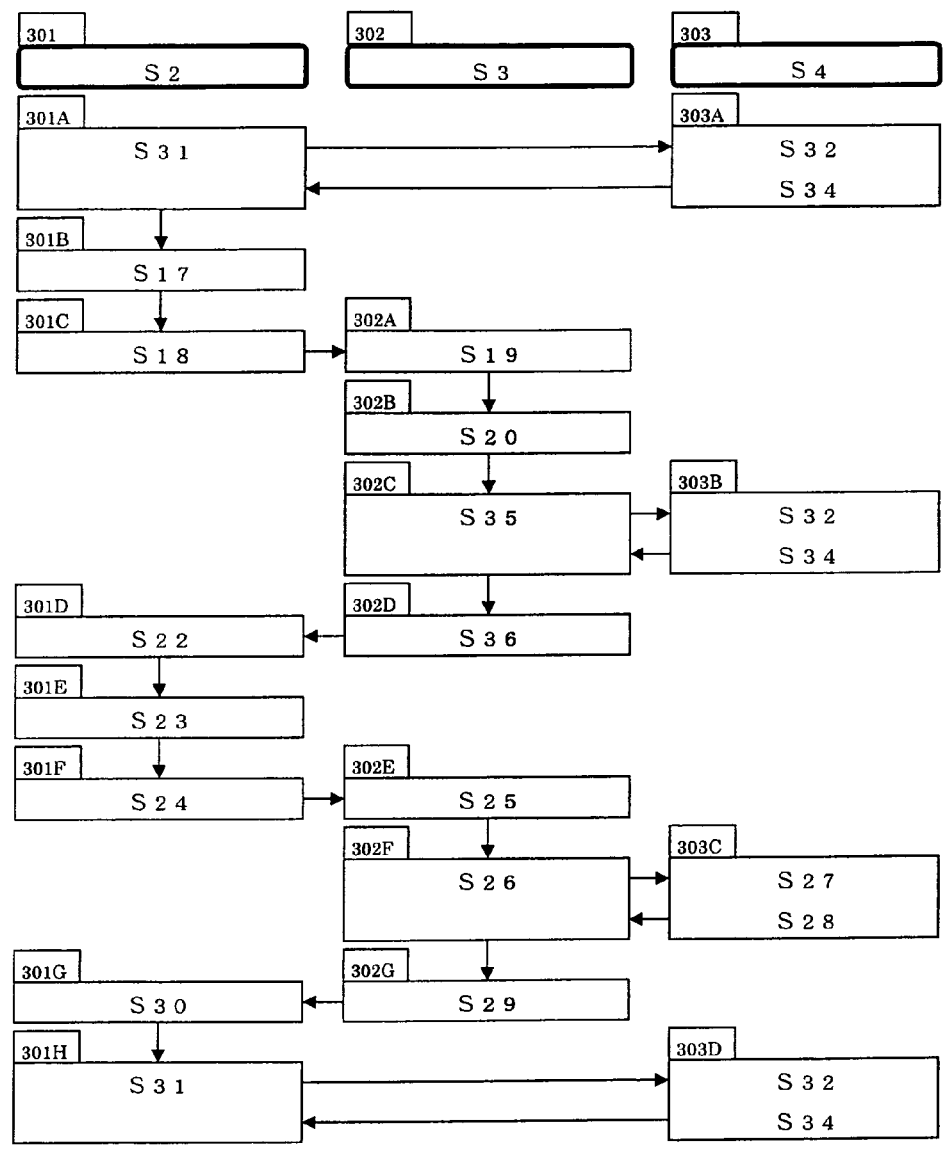
FIG. 3 shows a process flow on the acquisition, edition and update of contents data.

FIG. 3 shows a process flow on the acquisition, edition and storage of contents data. This enables not only edition of novel contents data but also edition of the existing contents data through addition of a procedure of acquisition of contents data by proxy to the flow in FIG. 2. The places added and changed mainly are (302C), (302D) and (303B).

(1) The public URL (302B) restoration-converted in the relay server is designated and the contents date are requested (302C) by the GET method of the HTTP protocol relative to the WEB server.

(2) The WEB server responds to (303B) the contents data in accordance with the request by the GET method of the HTTP protocol.

(3) The contents data responded and received are added to the editing application to make a response (302D) to the WEB browser.

(4) At the stage of having executed the editing application on the WEB browser through the foregoing steps, an editing task from a state in which the target contents have been displayed is made possible.

Figure 4:
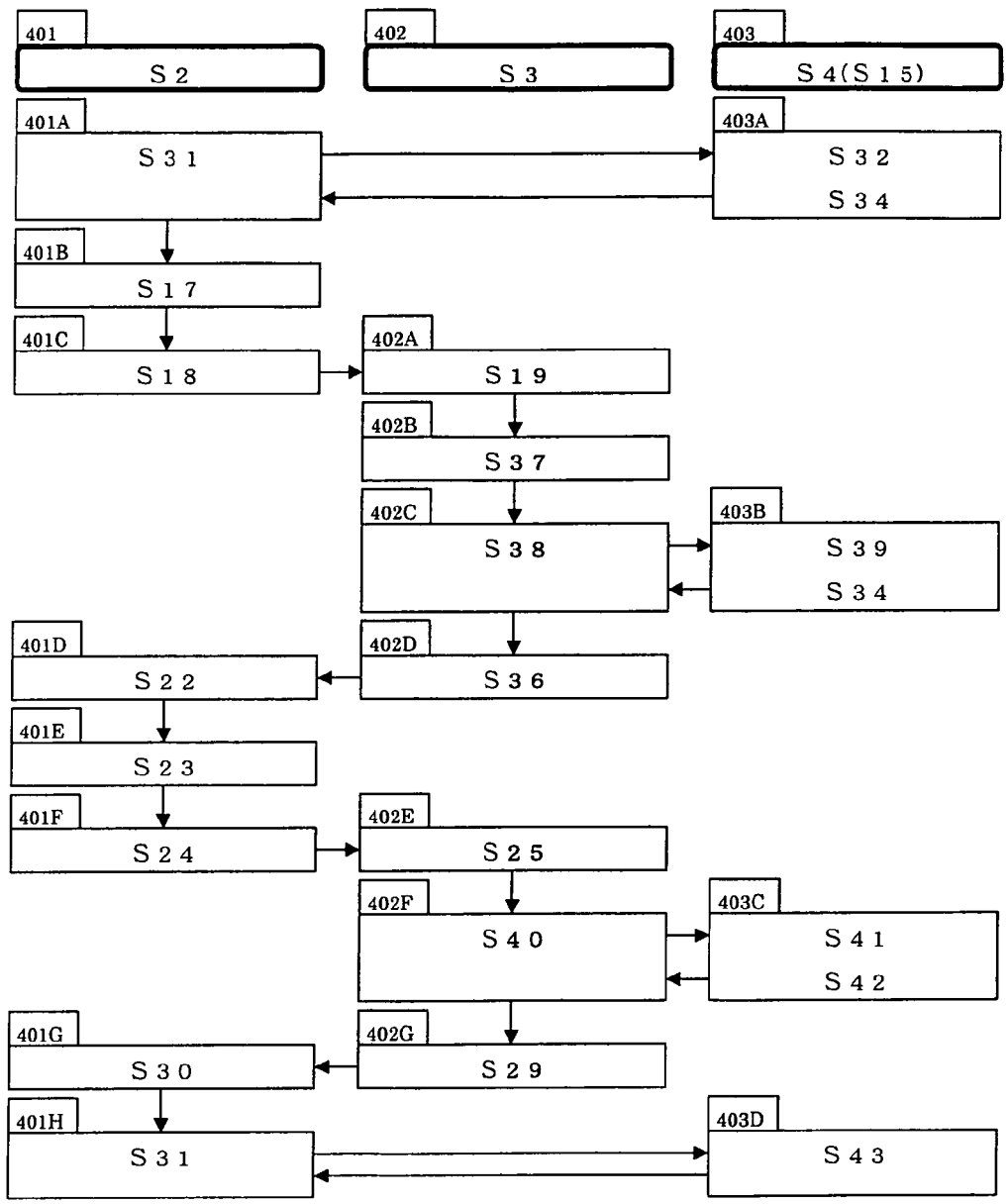
FIG. 4 shows a process flow corresponding to protocol conversion from HTTP to FTP.

FIG. 4 shows a process flow corresponding to protocol conversion from HTTP to FTP. Generally, this is seldom utilized at present on the Internet from the standpoint of security situation though the data of the HTTP protocol in FIG. 1 and FIG. 2 can be saved by the PUT method. For compensation for this situation, the FTP protocol conversion function is adopted to respond to the FTP server utilized in more WEB servers. The places mainly added to and changed from FIG. 3 are (402B), (402C), (402F), (403B) and (403C).

(1) A host name that is a WEB server name (FTP server name) and a directory path that is a contents save position are specified (402B) based on the public URL restoration-converted by the relay server and, upon designating these, an acquisition request of the contents file is published (402C) to the FTP server.

(2) The FTP server simultaneously operating within the WEB server respond to (403B) a target contents data file upon receiving a request from the relay server.

(3) After acceptance (402E) of the target contents save request (401F) on the relay server through a flow similar to that shown in FIG. 2, the specified WEB server name (FTP server name) and contents save position are designated to transfer (402F) the edited contents data to the FTP server.

(4) The FTP server having received the edited contents data saves (403C) the contents file at a designated position of the target contents data.

It becomes possible to respond to the FTP protocol through the foregoing steps without changing any interface of the WEB browser, unlike in the cases of FIG. 2 and FIG. 3, to dramatically increase users responding to the servers editable via the relay server.

Figure 5:
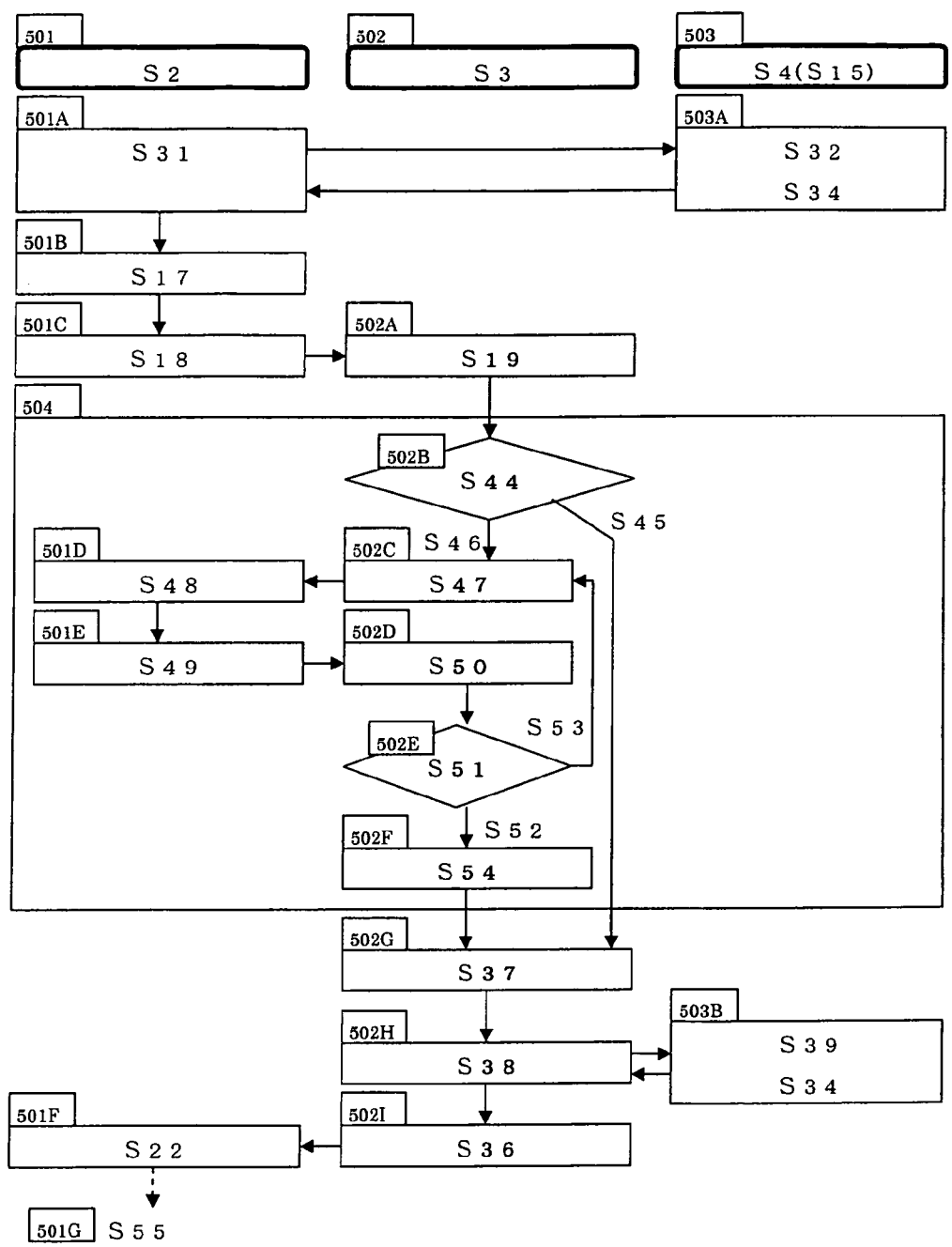
FIG. 5 shows a process flow of interrupt login.

FIG. 5 shows a process flow of interrupt login. This adds to a step of performing an interrupt login processing at the time of access acceptance by the relay server to return the processing to the conventional processing, thereby making it possible to directly enter contents edition without any pre-login, though the flows in FIG. 2 to FIG. 4 premise that the login has been performed and that the session has been established. The places added to FIG. 4 fall within a frame (504) indicating an interrupt login processing and the place omitted is (501G) subsequent to the contents edit task.

(1) The relay server having accepted access to the edit URL determines (502B) whether session establishment between the WEB browser and the relay server is effective.

(2) When the session has been determined to be effective, the processing continues in a URL restoration-conversion processing (502G).

(3) When the session has been determined to be invalid, the relay server responds to (502C) a screen for encouraging a login relative to the WEB browser.

(4) After the WEB browser having received the response displays (501D) the login screen, entry and send tasks (501E) of the login information (an account name and a password of FTP) are executed.

(5) The relay server receives (502D) the send of the login information and determines (502E) whether the login information is correct. (As the login determination method, a method of submitting inquiries to the DB within the relay server and a method of login authentication by the FTP server can be cited.)

(6) In the case of the login failure, the processing is returned again to the processing of responding to (502C) the login screen. In the case of the login success, a session is newly established (502F) and the processing is returned to the URL restoration-conversion processing (502G) that is the processing in the case where the session has been determined to be effective.

Through the foregoing steps, it becomes unnecessary to perform pre-login during the course of the edition and, when the login has already been performed, it is possible to enter the contents edit screen without performing the login each time.

Figure 6:
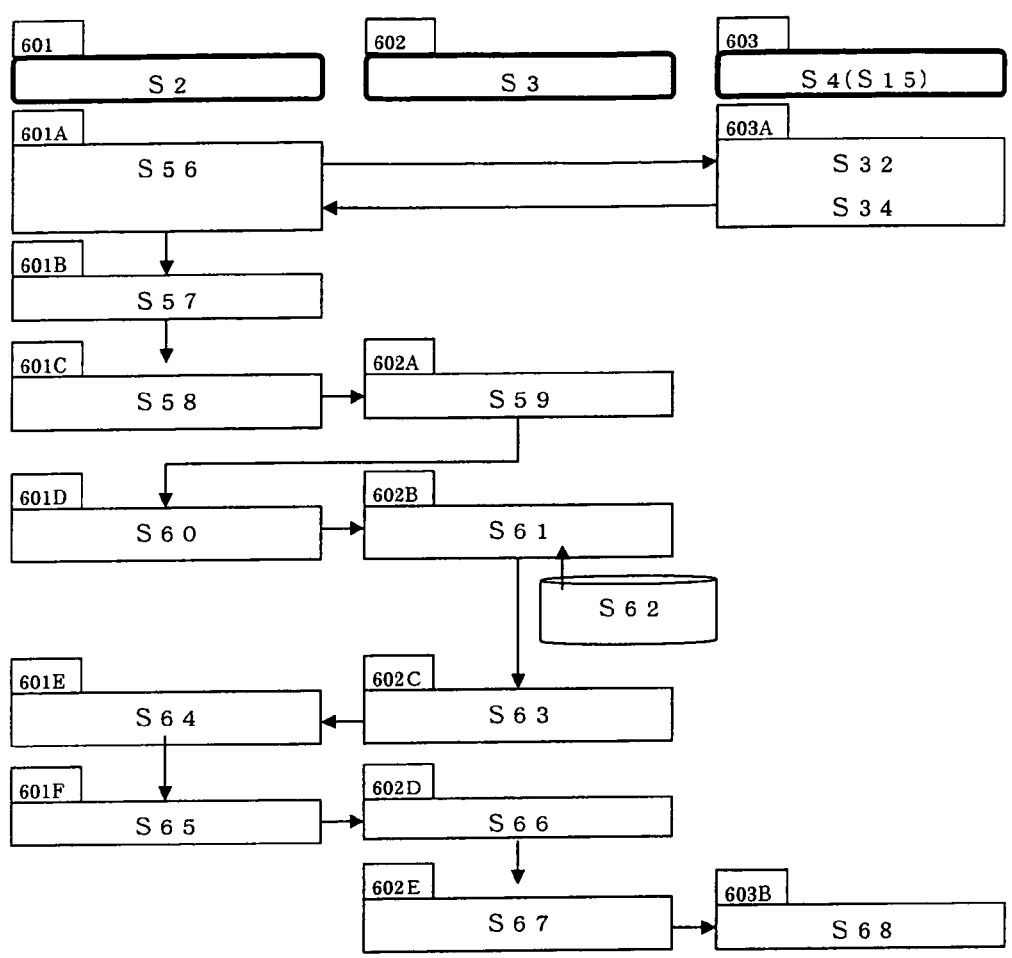
FIG. 6 shows an update flow utilizing an edited URL having host names omitted from a public URL.

FIG. 6 shows an update flow utilizing an edited URL having host names omitted from a public URL.

(1) In the WEB browser, the public URL is accessed (601A).

(2) Conversion (601B) is made to an edit URL having host names omitted from the public URL.

(3) The edit URL converted from the public URL is accessed (601C) using the WEB browser to transfer a directory path only.

(4) The relay server having accepted access to the edit URL responds to (602A) a screen for entering the login information relative to the WEB browser.

(5) The WEB browser having received the response displays (601D) the login screen and then executes entry and send tasks of the login information.

(6) The relay server receives the send of the login information and, when the login information is correct, acquires (602B) a host name corresponding to the login information from the database and saves the host name and directory path in the session.

(7) An edit application having received the response is executed (601E) on the WEB browser.

(8) After editing the contents on the WEB browser, a contents save request (601F) is sent to the relay server.

(9) The relay server having received the save request acquires (602D) a host name and a path from the session and requests the save thereof (602E) in a designated public URL area.

(10) The WEB server having received the save request saves (603B) the contents data in the designated public URL area.

A procedure of a URL conversion example will be described as follows. The regularity in the URL conversion premises that the edit URL has reversibility relative to the public URL and that a host name designation part of the edit URL is a host name accessible to the relay server. In the following description, an example of the public URL is expressed as http://www.cyberone.jp/index.html, a protocol designation part within the public URL as "http", a host name designation part as www.cyberone.jp and a directory designation part as "index.html".

As a general conversion technique for transferring a WEB server URL that is a relay destination relative to a relay center, a parameter transfer by a query string is conceivable.

By surrendering the public URL as a "target" parameter to http://edit.to/editor.php that is a relay server script, the edit URL becomes "http://edit.to/editor.php?target=http://www.cyberone.jp/inde.html". The relay server can acquire the public URL as a GET parameter. (a PHP example: $_GET['target'])

Subsequently, a method of omitting all the relay server scripts and entering the directory designation part of the relay server URL in the public URL is conceivable without any modification. The URL in this case becomes http://edit.to/www.cyberone.jp/index.html to express a protocol designation part as "http", a host name designation part as "edit.to" and a directory designation part as www.cyberone.jp/index.html.

Since the above conversion method does not utilize a parameter transfer, it is necessary to take a URL rewrite treatment (mod_rewrite etc.) so as to call up an actual script. An access destination path is acquired as an environment variable in an execution script to enable acquisition of the public URL.

Though the two conversion methods have secured reversibility relative to the public URL using the value of the edit URL, a method of registering the whole or part of the public URL beforehand and including in the edit URL an index (ID) published to secure the reversibility using a character string registered in the edit URL and relay server is conceivable.

For example, by registering a host name designation part within "http://www.cyberone.jp/index.html" that is the public URL beforehand in the relay server, acquiring an index "cyberone" published from the relay server and substituting the host name designation part for the index, a URL "http://cyberone/index.html" is acquired. Thereafter, by preparing relative to the relay server beforehand items to be omitted, it is possible to omit the protocol designation part "http://" or the extension ".html".

The character string "cyberone/index" produced through the above procedure is converted by the parameter transfer described in paragraph [0075] shown above to obtain "http://edit.to/edit.php?target=cyberone/index".

In the case of making a restoration conversion with the relay server based on the edit URL described in paragraph [0079] shown above, by acquiring a character string from the "target" parameter similarly to the target transfer, acquiring a character string data "www.cyberone.jp" registered inside the relay server, with the index part "cyberone" used as an index, and substituting the index part for the character string data, a character string "www.cyberone.jp/index" is produced. Subsequently, by adding the omitted protocol designation part "http:/" and extension ".html", it is possible to the public URL "http://www.cyberone.jp/index.html".

Though the three methods shown above can be utilized as a method of URL conversion also in paragraphs [0075], [0077] and [0079], a problem is posed in any of these methods when displaying images within the previews generated in steps (10) and (11) in paragraph [0031] containing the description concerning FIG. 1.

In an HTML source of the edit contents used for preview display, there is a case where absolute designation and relative designation are used as a source link attribute "scr=" of an image tag "<img>". As regards the absolute designation, because of a complete URL beginning with "http://~", normal images are displayed. In the case of the relative designation, however, since a primary contents public position (public URL) is designated as a criterion (current directory), there is a case where images are not correctly displayed in the preview display. (In the preview display, a relative position with the edit URL accessed to the relay server as a criterion)

When <img scr=/image/sample.gif> has been described as an image tag in the contents corresponding to the public URL, since an amendment is made, with the public URL as a criterion, the URL of the image to be referred to becomes "http://www.cyberone.jp/image/sample.gif".

When the image tag is amended, with the three edit URLs used as the criteria, the amended tags are as follows, respectively.

When the public URL has been designated as a URL parameter (paragraph [0075]), the edit URL becomes "http://edit.to/editor.php?target=http://www.cyberone.jp/index.html". In amending the image tag, with the URL as a relative designation criterion position, the URL of the image referred to becomes "http://edit.to/image/sample.giv" and it becomes impossible to accurately acquire a target parameter from the relay server. The same think can be said in terms of parameter transfer also in the conversion method (paragraph [0079]) for indexing the character string. In the case of the conversion method of designating the public URL in the URL directory part (paragraph [0077]), the edit URL becomes "http://edit.to/www.cyberone.jp/index.html", but the URL having the image tag amended with the URL as a criterion position after all becomes "http://edit.to/image/sample.giv". In this case, since not the parameter but the entire directory part is utilized as the public URL designation, it is impossible to accurately acquire an image URL due to a lack of a host name while it is possible to acquire a character string "/image/sample/gif" that is the amended URL directory part.

Though the above problems can be solved to some extent by taking countermeasures of amending and converting the image tag in the edit source within the relay server and retaining lacking data, problems will be detected in tweaking the contents data and equipping each place with an amending function to affect the development cost.

In light of these problems, a conversion method of adding a relay server domain name ".edit.to" to a public URL host name designation part. In this case, the edit URL becomes "http://www.cyberone.jp.edit.to/index.html".

In addition, when connecting, as a public URL host name designation part, an access destination host name acquired from an environment variable in the relay server and having a relay server domain name ".edt.to" removed therefrom and, as a public URL directory designation part, a path acquired from the environment variable, it is possible to acquire, as a restoration conversion result, a public URL "http://www.cyberone.jp.edit.to/image/sample.gif".

As regards the problem on the preview image, when a relative designation criterion position of the image tag is used as the edit URL "http:./www.cyberone.jp.edit.to/index.html", the amended image URL becomes "http://www.cyberone.jp.edit.to/image/sample.gif". When a restoration conversion from this URL is made in the same manner as in paragraph [0090], it is possible to acquire a URL "http://www.cyberone.jp/image/sample.gif" from which actual images can be referred to accurately.

This is because the directory designation positions of the public URL and edit URL have quite the same characteristics.

INDUSTRIAL APPLICABILITY

In spite of the fact that many companies have already possessed their own sites, at present, there are many cases where the sites cannot be updated within the companies. It can be said that the relay-type site (contents) updating system making the most use of the present invention can provide these companies with new updating means and at present exhibit high industrial applicability.

The invention claimed is:

1. A WEB contents editing function providing method for providing an Internet terminal with a function to edit contents disclosed on a WEB server via a relay server establishing a relay between the WEB server and the Internet terminal, wherein the relay server executes a processing that comprises
a step of receiving from the Internet terminal a request of connection to an edit URL,
a step of
restoring and converting the edit URL back to the public URL based on a transformation rule of acquiring the public URL which is included in the edit URL when the edit URL includes the public URL of the WEB server which has editable contents as a part of the edit URL or
restoring and converting the edit URL back to the public URL based on a transformation rule of acquiring the public URL corresponding to an index which is included in the edit URL when the edit URL includes the index of the public URL of the WEB server which has editable contents as a part of the edit URL,
a step of requesting a WEB server specified by the public URL to save contents data at save positions specified by the public URL,
a step of receiving the contents data from the WEB server,
a step of sending the contents data and a contents editing application to the Internet terminal,
a step of receiving from the Internet terminal a request for save of edited contents data edited by the editing application, and
a step of requesting the WEB server to save the edited contents data at the save positions in reply to the request for save.

2. A WEB contents editing function providing method according to claim 1, wherein the relay server converts a file transfer protocol for transferring the contents data to the WEB server from HTTP to FTP, SFTP, or SCP when requesting the WEB server to save the edited contents data at the save positions in reply to the request for save.

3. A WEB contents editing function providing method according to claim 1, wherein
the relay server checks up on a state of establishment of a session when receiving from the Internet terminal the request of connection to the edit URL, requests the Internet terminal to send login information when the session has been invalid, receives the login information from the Internet terminal and establishes the session when the login information is normal, and returns to a processing in a case where the session has been effective when checking up on the state of establishment of the session,
the relay server confirms with a database and determines whether the edit URL is an editable URL after acquiring the edit URL, and then
the relay server requests the WEB server to save the edited contents data at the save positions in reply to the request for save.

4. A WEB contents editing function providing method according to claim 1, wherein the public URL has a directory designation part identical with a directory designation part the edit URL has.

5. A WEB contents editing function providing method according to claim 1, wherein the public URL has a host name designation part acquired from inside session information or a database.

6. A WEB contents editing function providing device that is a device for providing a function to edit contents disclosed on a WEB server and comprises
a first request receiving device receiving from an Internet terminal a request of connection to an edit URL,
a restoring device
restoring and converting the edit URL back to the public URL based on a transformation rule of acquiring the public URL which is included in the edit URL when the edit URL includes the public URL of the WEB server which has editable contents as a part of the edit URL or
restoring and converting the edit URL back to the public URL based on a transformation rule of acquiring the public URL corresponding to an index which is included in the edit URL when the edit URL includes the index of the public URL of the WEB server which has editable contents as a part of the edit URL,
a first requesting device requesting a WEB server specified by the public URL to save contents data at save positions specified by the public URL,
a contents data receiving device receiving the contents data from the WEB server,
a sending device sending the contents data and a contents editing application to the Internet terminal,
a second request receiving device receiving from the Internet terminal a request for save of edited contents data edited by the editing application, and
a second requesting device requesting the WEB server to save the edited contents data at the save positions in reply to the request for save.

7. A WEB contents editing function providing device according to claim 6, wherein a file transfer protocol for transferring the contents data to the WEB server is converted from HTTP to FTP, SFTP, or SCP when requesting the WEB server to save the edited contents data at the save positions in reply to the request for save.

8. A WEB contents editing function providing device according to claim 6, wherein
a state of establishment of a session is checked up on when receiving from the Internet terminal the request of connection to the edit URL, the Internet terminal is requested to send login information when the session has been invalid, the login information is received from the Internet terminal and the session is established when the login information is normal, and a processing is returned to in a case where the session has been effective when checking up on the state of establishment of the session,
the relay server confirms with a database and determines whether the edit URL is an editable URL after acquiring the edit URL, and then
the relay server requests the WEB server to save the edited contents data at the save positions in reply to the request for save.

9. A WEB contents editing function providing device according to claim 6, wherein the public URL has a directory designation part identical with a directory designation part the edit URL has.

10. A WEB contests editing function providing device according to claim 6, wherein the public URL has a host name designation part acquired from inside session information or a database.

11. A WEB contents editing function providing device according to claim 1, wherein the relay server removes a domain name of the relay server from the edit URL when converting the edit URL to the public URL.

12. A WEB contents editing function providing device according to claim 6, wherein the relay server removes a domain name of the relay server from the edit URL when converting the edit URL to the public URL.

* * * * *